(12) United States Patent  
Brothers et al.

(10) Patent No.: US 7,897,682 B2
(45) Date of Patent: Mar. 1, 2011

(54) AQUEOUS POLYMERIZATION OF FLUORINATED MONOMERS USING POLYMERIZATION AGENT COMPRISING FLUOROPOLYETHER ACID OR SALT AND HYDROCARBON SURFACTANT

(75) Inventors: Paul Douglas Brothers, Chadds Ford, PA (US); Subhash Vishnu Gangal, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 270 days.

(21) Appl. No.: 11/937,536

(22) Filed: Nov. 9, 2007

(65) Prior Publication Data

US 2008/0114121 A1    May 15, 2008

Related U.S. Application Data

(60) Provisional application No. 60/858,008, filed on Nov. 9, 2006.

(51) Int. Cl.
    *C08K 5/06* (2006.01)
(52) U.S. Cl. .................. 524/758; 524/759; 524/760
(58) Field of Classification Search .............. 524/758, 524/759, 760
    See application file for complete search history.

(56) References Cited

U.S. PATENT DOCUMENTS

| | | | |
|---|---|---|---|
| 2,559,752 A | 7/1951 | Berry | |
| 2,713,593 A | 7/1955 | Brice et al. | |
| 3,271,341 A | 9/1966 | Garrison | |
| 3,282,875 A | 11/1966 | Connolly et al. | |
| 3,291,843 A | 12/1966 | Fritz et al. | |
| 3,391,099 A | 7/1968 | Punderson | |
| 3,839,425 A | 10/1974 | Bartlett | |
| 4,036,802 A | 7/1977 | Poirier | |
| 4,358,545 A | 11/1982 | Ezzell et al. | |
| 4,380,618 A | 4/1983 | Khan et al. | |
| 4,381,384 A | 4/1983 | Khan | |
| 4,463,144 A | 7/1984 | Kojima et al. | |
| 4,552,631 A | 11/1985 | Bissot et al. | |
| 4,621,116 A | 11/1986 | Morgan | |
| 4,743,658 A | 5/1988 | Imbalzano et al. | |
| 4,789,717 A | 12/1988 | Giannetti et al. | |
| 4,864,006 A | 9/1989 | Giannetti et al. | |
| 5,285,002 A | 2/1994 | Grootaert | |
| 5,637,748 A | 6/1997 | Hung et al. | |
| 5,688,884 A | 11/1997 | Baker et al. | |
| 5,763,552 A | 6/1998 | Feiring et al. | |
| 5,789,508 A | 8/1998 | Baker et al. | |
| 5,925,705 A | 7/1999 | Araki et al. | |
| 5,959,026 A * | 9/1999 | Abusleme et al. ........... 524/758 |
| 6,177,196 B1 | 1/2001 | Brothers et al. | |
| 6,300,445 B1 | 10/2001 | Hung et al. | |
| 6,395,848 B1 | 5/2002 | Morgan et al. | |
| 6,429,258 B1 | 8/2002 | Morgan et al. | |
| 6,465,577 B2 | 10/2002 | Okanishi et al. | |
| 6,841,616 B2 | 1/2005 | Wille et al. | |
| 6,869,997 B2 | 3/2005 | Wille et al. | |
| 6,878,772 B2 | 4/2005 | Visca et al. | |
| 7,141,537 B2 | 11/2006 | Audenaert et al. | |
| 7,705,074 B2 | 4/2010 | Brothers et al. | |
| 2004/0072977 A1 | 4/2004 | Kaulbach et al. | |
| 2005/0090613 A1 | 4/2005 | Maruya et al. | |
| 2006/0166007 A1 | 7/2006 | Kent et al. | |
| 2006/0281946 A1 | 12/2006 | Morita et al. | |
| 2007/0015864 A1 | 1/2007 | Hintzer et al. | |
| 2007/0015865 A1 | 1/2007 | Hintzer et al. | |
| 2007/0015866 A1 | 1/2007 | Hintzer et al. | |
| 2007/0015937 A1 | 1/2007 | Hintzer et al. | |
| 2007/0142541 A1 | 6/2007 | Hintzer et al. | |

FOREIGN PATENT DOCUMENTS

| | | |
|---|---|---|
| EP | 0250767 B1 | 9/1991 |
| EP | 0148482 B1 | 3/1992 |
| EP | 1679352 B2 | 7/2006 |
| EP | 1334996 B1 | 11/2008 |
| GB | 1292268 | 10/1972 |
| JP | 2003119204 A | 4/2003 |
| JP | 2004358397 A | 12/2004 |
| JP | 2004359870 A | 12/2004 |
| WO | 99/37720 | 7/1999 |
| WO | 01/46116 A1 | 6/2001 |
| WO | 02/30848 A1 | 4/2002 |
| WO | 2007046345 A1 | 4/2007 |
| WO | 2007046377 A1 | 4/2007 |

(Continued)

OTHER PUBLICATIONS

Hill, "Silicone Surfactants", Marcel Dekker Inc., ISBN 0-8247-00104, vol. 86, pp. 5-6, 1999.

(Continued)

*Primary Examiner*—Edward J Cain

(57) ABSTRACT

A process for polymerizing at least one fluorinated monomer in an aqueous medium in the presence of initiator and polymerization agent to form an aqueous dispersion of particles of fluoropolymer having a fluoropolymers solids content of at least about 10% by weight. The polymerization agent is a combination of fluoropolyether acid or salt thereof and hydrocarbon surfactant. The aqueous medium contains less than about 300 ppm of perfluoroalkane carboxylic acid or salt fluorosurfactants. The process is preferably performed without adding polymer seed prior to polymerization kick-off.

4 Claims, No Drawings

FOREIGN PATENT DOCUMENTS

WO    2007046482 A1    4/2007
WO    2007049517 A1    5/2007

OTHER PUBLICATIONS

Non-Final Office Action, U.S. Appl. No. 11/937,544, dated Apr. 14, 2009.
Non-Final Office Action, U.S. Appl. No. 11/937,548, dated Sep. 10, 2009.
Non-Final Office Action, U.S. Appl. No. 11/937,541, dated Sep. 17, 2009.
Kasai, Paul H., "Perfluoropolyethers With Acid End Groups: Amphiphilicity and Emulsification," Journal of Applied Polymer Science, vol. 57, pp. 797-809 (1995).
Hill, "Silicone Surfactants", Marcel Dekker Inc., ISBNO-8247-00104, pp. 5-6.
Non-Final Office Action, U.S. Appl. No. 12/712,278, Dated Jun. 14, 2010.
Non-Final Office Action, U.S. Appl. No. 12/712,286, Dated Jul. 9, 2010.
Non-Final Office Action, U.S. Appl. No. 12/712,292, Dated Aug. 18, 2010.

* cited by examiner

AQUEOUS POLYMERIZATION OF FLUORINATED MONOMERS USING POLYMERIZATION AGENT COMPRISING FLUOROPOLYETHER ACID OR SALT AND HYDROCARBON SURFACTANT

FIELD OF THE INVENTION

This invention relates to a process for the dispersion polymerization of fluorinated monomers in an aqueous polymerization medium.

BACKGROUND OF THE INVENTION

A typical process for the aqueous dispersion polymerization of fluorinated monomers includes feeding fluorinated monomer to a heated reactor containing a fluorosurfactant and deionized water. Paraffin wax is employed in the reactor as a stabilizer for some polymerizations, e.g., polytetrafluoroethylene (PTFE) homopolymers. A free-radical initiator solution is employed and, as the polymerization proceeds, additional fluorinated monomer is added to maintain the pressure. A chain transfer agent is employed in the polymerization of some polymers, e.g., melt-processible TFE copolymers to control melt viscosity. After several hours, the feeds are stopped, the reactor is vented and purged with nitrogen, and the raw dispersion in the vessel is transferred to a cooling or holding vessel.

For use in fluoropolymer coating applications, polymer dispersion is typically transferred to a dispersion concentration operation which produces stabilized dispersions used as coatings for metals, glass and fabric. Certain grades of PTFE dispersion are made for the production of fine powder. For this use, the dispersion is coagulated, the aqueous medium is removed and the PTFE is dried to produce fine powder. Melt-processible fluoropolymers for molding resin use are also coagulated and dried and then processed into a convenient form such as flake, chip or pellet for use in subsequent melt-processing operations.

As described in U.S. Pat. No. 3,391,099 to Punderson, dispersion polymerization involves two generally distinct periods or phases. The initial period of the reaction is a nucleation phase in which a given number of polymerization sites or nuclei are established. Subsequently, there occurs a growth phase in which polymerization of fluorinated monomer on established particles occurs with little or no formation of new particles. Successful production of the high solids fluoropolymer dispersion generally requires the presence of the fluorosurfactant, especially in the later growth phase of polymerization in order to stabilize the dispersion preventing coagulation of the fluoropolymer particles.

Fluorosurfactants used in the polymerization are usually anionic, non-telogenic, soluble in water and stable to reaction conditions. The most widely used fluorosurfactants are perfluoroalkane carboxylic acids and salts as disclosed in U.S. Pat. No. 2,559,752 to Berry. Because of recent environmental concerns with regard to perfluoroalkane carboxylic acids and salts, there is interest in reducing or eliminating perfluoroalkane carboxylic acid surfactants in fluoropolymer polymerization processes.

Perfluoroether carboxylic acids and salts are disclosed in U.S. Pat. No. 3,271,341 to Garrison, U.S. Pat. No. 3,391,099 to Punderson and US 2005/0090613 to Maruya for use in the aqueous polymerization of fluorinated monomers. U.S. Pat. No. 4,864,006 to Gianetti et al. discloses the polymerization of fluorinated monomers in the presence of a perfluoropolyether having neutral end groups, a perfluoropolyether oil, in the form of an aqueous microemulsion. The aqueous microemulsion can be prepared using a perfluoropolyether having carboxylic end groups or cationic end groups. Examples in US 2005/00906 to Maruya et al. demonstrate the use of perfluoroether carboxylic acids and salts in producing TFE copolymers by producing polymer seed particles and subsequently completing the polymerization. In U.S. Pat. No. 6,395,848 to Morgan et al., aqueous dispersion polymerization of fluorinated monomers is improved by using a combination of fluorosurfactants, one of which is a perfluoropolyether carboxylic acid or sulfonic acid or salt of either.

BRIEF SUMMARY OF INVENTION

It has been discovered that a polymerization agent comprising a fluoropolyether acid or salt and hydrocarbon surfactant provides an effective polymerization agent for use in the manufacture of fluoropolymers. The process of the present invention, even when using limited quantities of polymerization agent, unexpectedly produces aqueous fluoropolymer dispersion with good solids content with low amounts of undispersed polymer without the use of perfluoroalkane carboxylic acid surfactants.

The present invention provides a process for polymerizing at least one fluorinated monomer in an aqueous medium in the presence of initiator and polymerization agent comprising fluoropolyether acid or salt thereof and hydrocarbon surfactant to form an aqueous dispersion of particles of fluoropolymer having a fluoropolymers solids content of at least about 10% by weight. The aqueous medium contains less than about 300 ppm of perfluoroalkane carboxylic acid or salt fluorosurfactants. In a preferred embodiment, the process is performed such that the polymerization medium is substantially free of fluoropolymer seed at polymerization kick-off.

The process preferably includes a polymerization agent which comprises a major amount by weight of fluoropolyether acid or salt thereof and a minor amount by weight of hydrocarbon surfactant. In preferred embodiments, the fluoropolyether acid or salt thereof is a perfluoroether acid or salt thereof, the acid groups are selected from carboxylic acid, sulfonic acid, and phosphonic acid, and the number average molecular weight of the fluoropolyether acid or salt thereof is about 800 to about 3500 g/mol, more preferably about 1000 to about 2500.

In one preferred embodiment of the present invention, substantially all of the polymerization agent is added to the aqueous medium prior to polymerization, for example, charging the reactor with a single addition of polymerization agent. In another preferred embodiment of the invention, the aqueous medium is substantially free of perfluoropolyether oils.

DETAILED DESCRIPTION OF THE INVENTION

Fluoropolymer

Fluoropolymer dispersions formed by this invention are comprised of particles of fluoropolymer made from at least one fluorinated monomer, i.e., wherein at least one of the monomers contains fluorine, preferably an olefinic monomer with at least one fluorine or a perfluoroalkyl group attached to a doubly-bonded carbon. The fluoropolymers can be homopolymers of one fluorinated monomer or copolymers of two or more monomers, at least one of which is fluorinated. The fluorinated monomer used in the process of this invention is preferably independently selected from the group consisting of tetrafluoroethylene (TFE), hexafluoropropylene (HFP), chlorotrifluoroethylene (CTFE), trifluoroethylene, hexafluoroisobutylene, perfluoroalkyl ethylene, fluorovinyl ethers, vinyl fluoride (VF), vinylidene fluoride (VF2), perfluoro-2,2-dimethyl-1,3-dioxole (PDD) and perfluoro-2-methylene-4-methyl-1,3-dioxolane (PMD). A preferred perfluoroalkyl ethylene monomer is perfluorobutyl ethylene (PFBE). Preferred fluorovinyl ethers include perfluoro(alkyl vinyl ether) monomers (PAVE) such as perfluoro(propyl vinyl ether) (PPVE), perfluoro(ethyl vinyl ether) (PEVE), and perfluoro(methyl vinyl ether) (PMVE). Non-fluorinated olefinic comonomers such as ethylene and propylene can be copolymerized with fluorinated monomers.

Fluorovinyl ethers also include those useful for introducing functionality into fluoropolymers. These include $CF_2=CF-(O-CF_2CFR_f)_a-O-CF_2CFR'_fSO_2F$, wherein $R_f$ and $R'_f$ are independently selected from F, Cl or a perfluorinated alkyl group having 1 to 10 carbon atoms, a=0, 1 or 2. Polymers of this type are disclosed in U.S. Pat. No. 3,282,875 ($CF_2=CF-O-CF_2CF(CF_3)-O-CF_2CF_2SO_2F$, perfluoro(3,6-dioxa-4-methyl-7-octenesulfonyl fluoride)), and in U.S. Pat. Nos. 4,358,545 and 4,940,525 ($CF_2=CF-O-CF_2CF_2SO_2F$). Another example is $CF_2=CF-O-CF_2-CF(CF_3)-O-CF_2CF_2CO_2CH_3$, methyl ester of perfluoro (4,7-dioxa-5-methyl-8-nonenecarboxylic acid), disclosed in U.S. Pat. No. 4,552,631. Similar fluorovinyl ethers with functionality of nitrile, hydroxyl, cyanate, carbamate, and phosphonic acid are disclosed in U.S. Pat. Nos. 5,637,748; 6,300,445; and 6,177,196.

The invention is especially useful when producing dispersions of melt-processible fluoropolymers. By melt-processible, it is meant that the polymer can be processed in the molten state (i.e., fabricated from the melt into shaped articles such as films, fibers, and tubes etc. that exhibit sufficient strength and toughness to be useful for their intended purpose). Examples of such melt-processible fluoropolymers include homopolymers such as polychlorotrifluoroethylene or copolymers of tetrafluoroethylene (TFE) and at least one fluorinated copolymerizable monomer (comonomer) present in the polymer usually in sufficient amount to reduce the melting point of the copolymer substantially below that of TFE homopolymer, polytetrafluoroethylene (PTFE), e.g., to a melting temperature no greater than 315° C.

A melt-processible TFE copolymer typically incorporate an amount of comonomer into the copolymer in order to provide a copolymer which has a melt flow rate (MFR) of about 1-100 g/10 min as measured according to ASTM D-1238 at the temperature which is standard for the specific copolymer. Preferably, the melt viscosity is at least about $10^2$ Pa·s, more preferably, will range from about $10^2$ Pa·s to about $10^6$ Pa·s, most preferably about $10^3$ to about $10^5$ Pa·s measured at 372° C. by the method of ASTM D-1238 modified as described in U.S. Pat. No. 4,380,618. Additional melt-processible fluoropolymers are the copolymers of ethylene or propylene with TFE or CTFE, notably ETFE, ECTFE and PCTFE.

A preferred melt-processible copolymer for use in the practice of the present invention comprises at least about 40-98 mol % tetrafluoroethylene units and about 2-60 mol % of at least one other monomer. Preferred comonomers with TFE are perfluoroolefin having 3 to 8 carbon atoms, such as hexafluoropropylene (HFP), and/or perfluoro(alkyl vinyl ether) (PAVE) in which the linear or branched alkyl group contains 1 to 5 carbon atoms. Preferred PAVE monomers are those in which the alkyl group contains 1, 2, 3 or 4 carbon atoms, and the copolymer can be made using several PAVE monomers. Preferred TFE copolymers include FEP (TFE/HFP copolymer), PFA (TFE/PAVE copolymer), TFE/HFP/PAVE wherein PAVE is PEVE and/or PPVE, MFA (TFE/PMVE/PAVE wherein the alkyl group of PAVE has at least two carbon atoms) and THV (TFE/HFPNF2).

The invention is also useful when producing dispersions of polytetrafluoroethylene (PTFE) including modified PTFE. PTFE and modified PTFE typically have a melt creep viscosity of at least $1 \times 10^8$ Pa·s and, with such high melt viscosity, the polymer does not flow significantly in the molten state and therefore is not a melt-processable polymer. Polytetrafluoroethylene (PTFE) refers to the polymerized tetrafluoroethylene by itself without any significant comonomer present. Modified PTFE refers to copolymers of TFE with such small concentrations of comonomer that the melting point of the resultant polymer is not substantially reduced below that of PTFE. The concentration of such comonomer is preferably less than 1 weight %, more preferably less than 0.5 weight %. A minimum amount of at least about 0.05 wt % is preferably used to have significant effect. The modified PTFE containing a small amount of comonomer modifier has improved film forming capability during baking (fusing). Suitable comonomers include perfluoroolefin, notably hexafluoropropylene (HFP) or perfluoro(alkyl vinyl ether) (PAVE), where the alkyl group contains 1 to 5 carbon atoms, with perfluoro(ethyl vinyl ether) (PEVE) and perfluoro(propyl vinyl ether) (PPVE) being preferred. Chlorotrifluoroethylene (CTFE), perfluorobutyl ethylene (PFBE), or other monomer that introduces bulky side groups into the molecule may also be used.

Further useful polymers are film forming polymers of polyvinylidene fluoride (PVDF) and copolymers of vinylidene fluoride as well as polyvinyl fluoride (PVF) and copolymers of vinyl fluoride.

Fluoropolyether Acid or Salt

One component of the polymerization agent combination used in the practice of the present invention is a fluoropolyether acid or salt thereof. Preferably, the fluoropolyether is a perfluoropolyether acid or salt thereof. The acid groups of the fluoropolyether acid or salt thereof preferably are acid groups selected from carboxylic acid, sulfonic acid, phosphonic acid. In preferred embodiments, the acid group of the fluoropolyether acid or salt there is carboxylic acid. Preferably, the fluoropolyether acid is employed as a salt, most preferably, an ammonium salt.

Preferred perfluoropolyether (PFPE) acids or salts thereof for use in accordance with the present invention can have any chain structure in which oxygen atoms in the backbone of the molecule are separated by saturated fluorocarbon groups having 1-3 carbon atoms. More than one type of fluorocarbon group may be present in the molecule. Representative structures have the repeat unit

 (I)

 (II)

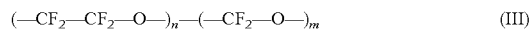 (III)

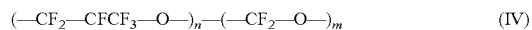 (IV)

These structures are discussed by Kasai in J. Appl. Polymer Sci. 57, 797 (1995). As disclosed therein, such PFPE can have a carboxylic acid group or salt thereof at one end or at both ends. Similarly, such PFPE may have a sulfonic acid or phosphonic acid group or salt thereof at one end or both ends. In addition, PFPE with acid functionality at both ends may have a different group at each end. For monofunctional PFPE, the other end of the molecule is usually perfluorinated but may contain a hydrogen or chlorine atom. PFPE having an acid group at one or both ends for use in the present invention has at least 2 ether oxygens, preferably at least 4 ether oxygens, and even more preferably at least 6 ether oxygens. Preferably, at least one of the fluorocarbon groups separating ether oxygens, and more preferably at least two of such fluorocarbon groups, has 2 or 3 carbon atoms. Even more preferably, at least 50% of the fluorocarbon groups separating ether oxygens have 2 or 3 carbon atoms. Also, preferably, the PFPE has a total of at least 9 carbon atoms, e.g., the minimum value of n or n+m in the above repeat unit structures is at least 3. More than one PFPE having an acid group at one or both ends can be used in a process in accordance with the invention. Typically, unless extraordinary care is employed to manufacture a single specific PFPE compound, the PFPE may contain multiple compounds in varying proportions within a molecular weight range about the average molecular weight.

The fluoropolyether acid or salt thereof has an average molecular weight which enables it to function in combination with hydrocarbon surfactant as a polymerization agent in a process in accordance with the present invention. The number average molecular weight of the fluoropolyether acid or salt preferably is greater than about 500 g/mol but less than about 6000 g/mol because fluoropolyether acids or salt with very high molecular weights generally are difficult to dissolve/disperse in the aqueous polymerization medium. More preferably, the fluoropolyether acid or salt thereof employed in accordance with the invention has an number average molecular weight of about 800 to about 3500 g/mol, more preferably about 1000 to about 2500, most preferably about 1200 to about 2000.

Hydrocarbon Surfactant

The other component of the polymerization agent combination used in the process of this invention is a hydrocarbon surfactant. Suitable hydrocarbon surfactants may be nonionic, cationic, or anionic.

In one preferred embodiment the hydrocarbon surfactant is a nonionic hydrocarbon surfactant. Nonionic surfactants include polyoxyethylene alkyl ethers, polyoxyethylene alkyl phenyl ethers, polyoxyethylene alkyl esters, sorbitan alkyl esters, polyoxyethylene sorbitan alkyl esters, glycerol esters, their derivatives and the like. More specifically examples of polyoxyethylene alkyl ethers are polyoxyethylene lauryl ether, polyoxyethylene cetyl ether, polyoxyethylene stearyl ether, polyoxyethylene oleyl ether, polyoxyethylene behenyl ether and the like; examples of polyoxyethylene alkyl phenyl ethers are polyoxyethylene nonyl phenyl ether, polyoxyethylene octyl phenyl ether and the like; examples of polyoxyethylene alkyl esters are polyethylene glycol monolaurylate, polyethylene glycol monooleate, polyethylene glycol monostearate and the like; examples of sorbitan alkyl esters are polyoxyethylene sorbitan monolaurylate, polyoxyethylene sorbitan monopalmitate, polyoxyethylene sorbitan monostearate, polyoxyethylene sorbitan monooleate and the like; examples of polyoxyethylene sorbitan alkyl esters are polyoxyethylene sorbitan monolaurylate, polyoxyethylene sorbitan monopalmitate, polyoxyethylene sorbitan monostearate and the like; and examples of glycerol esters are glycerol monomyristate, glycerol monostearate, glycerol monooleate and the like. Also examples of their derivatives are polyoxyethylene alkyl amine, polyoxyethylene alkyl phenyl-formaldehyde condensate, polyoxyethylene alkyl ether phosphate and the like. Particularly preferable are polyoxyethylene alkyl ethers and polyoxyethylene alkyl esters which have an HLB value of 10 to 18. More particularly there are polyoxyethylene lauryl ether (EO: 5 to 20. EO stands for an ethylene oxide unit.), polyethylene glycol monostearate (EO: 10 to 55) and polyethylene glycol monooleate (EO: 6 to 10).

Suitable nonionic hydrocarbon surfactants include octyl phenol ethoxylates such as the Triton® X series supplied by Dow Chemical Company:

Triton ®

X15 (n~1.5)
X45 (n~4.5)
X100 (n~10)

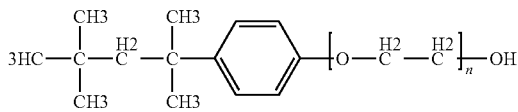

Preferred nonionic hydrocarbon surfactants are branched alcohol ethoxylates such as the Tergitol® 15-S series supplied by Dow Chemical Company and branched secondary alcohol ethoxylates such as the Tergitol® TMN series also supplied by Dow Chemical Company.:

Tergitol ®

TMN-6 (n~8)
TMN-10 (n~11)
TMN-100 (n~10)

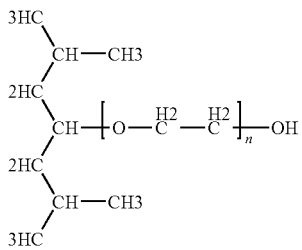

Ethyleneoxide/propylene oxide copolymers such as the Tergitol® L series surfactant supplied by Dow Chemical Company are also useful in this invention.

Another group of suitable nonionic hydrocarbon surfactants are tridecyl alcohol alkoxylates supplied as Iconol® TDA series from BASF Corporation.

Iconol ®

TDA-6 (n = 6)
TDA-9 (n = 9)
TDA-10 (n = 10)

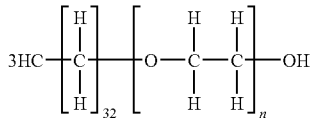

Yet another useful group of suitable nonionic hydrocarbon surfactants are difunctional block copolymers supplied as Pluornic® R series from BASF, such as:

Pluronic ® R

31R1 (m~26, n~8)
17R2 (m~14, n~9)
10R5 (m~8, n~22)

-continued

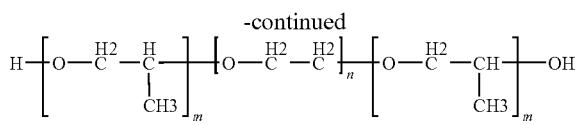

In another embodiment the hydrocarbon surfactant is an anionic hydrocarbon surfactant. One such example is the highly branched C10 tertiary carboxylic acid supplied as Versatic® 10 by Resolution Performance Products.

Versatic ® 10
Neodecanoic acid (n + m = 7)

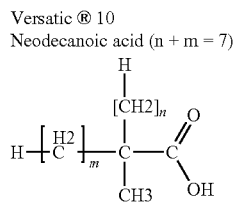

Another useful anionic hydrocarbon surfactant is the sodium linear alkyl polyether sulfonates supplied as the Avanel S series by BASF. The ethylene oxide chain provides nonionic characteristics to the surfactant and the sulfonate groups provide certain anionic characteristics.

Avanel ®

S-70 (n = 7, m = 11-14)
S-74 (n = 3, m = 8)

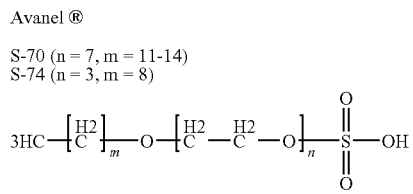

Process

In the practice of a preferred embodiment of the invention, the process is carried out as a batch process in a pressurized reactor. Suitable vertical or horizontal reactors for carrying out the process of the invention are equipped with stirrers for the aqueous medium to provide sufficient contact of gas phase monomers such as TFE for desirable reaction rates and uniform incorporation of comonomers if employed. The reactor preferably includes a jacket surrounding the reactor so that the reaction temperature may be conveniently controlled by circulation of a controlled temperature heat exchange medium.

In a typical process, the reactor is first charged with deionized and deaerated water to which the fluoropolyether acid or salt thereof and polymerization agent combination is added. The addition of the fluoropolyether acid or salt thereof and hydrocarbon surfactant combination is discussed in more detail hereinafter. A suitable procedure for TFE copolymers such as FEP or PFA includes first pressurizing the reactor with TFE. Some or all of the comonomer such as HFP or perfluoro(alkyl vinyl ether) is then added and normally a chain transfer agent such as ethane is also added to reduce the molecular weight and increase melt flow of the copolymer as desired for use. A free-radical initiator solution such as ammonium persulfate solution is then added. The temperature is increased and, once polymerization begins, additional TFE is added to maintain the pressure. The beginning of polymerization is referred to as kick-off and is defined as the point at which gaseous monomer feed pressure is observed to drop substantially, for example, about 10 psi (about 70 kPa). Moreover, in a preferred process, the polymerization medium is substantially free of fluoropolymer seed at polymerization kick-off. In this preferred form of the invention, fluoropolymer seed, i.e., separately polymerized small fluoropolymer particles in dispersion form, is not added prior to the start of polymerization. Comonomer and/or chain transfer agent can also be added as the polymerization proceeds. For some polymerizations, additional initiator and or polymerization agent may be added during the polymerization.

Batch dispersion polymerizations can be described as proceeding in two phases. The initial period of the reaction can be said to be a nucleation phase during which a given number particles are established. Subsequently, it can be said that a growth phase occurs in which the predominant action is polymerization of monomer on established particles with little or no formation of new particles. The transition from the nucleation to the growth phase of polymerization occurs smoothly, typically between about the 4 and about the 10 percent solids for the polymerization of TFE.

After batch completion (typically several hours) when the desired amount of polymer or solids content has been achieved, the feeds are stopped, the reactor is vented, and the raw dispersion in the vessel is transferred to a cooling or holding vessel.

The solids content of fluoropolymer dispersion produced by the process of the invention is at least about 10% by weight. Preferably, the fluoropolymers solids content is at least about 20% by weight. A preferred range for fluoropolymer solids content produced by the process is about 20% to about 65% by weight, more preferably about 20% to about 55% by weight.

In a preferred process of the invention, polymerizing produces less that about 10 wt %, more preferably less than about 3 wt %, even more preferably less than about 1 wt %, most preferably less than about 0.5 wt % undispersed fluoropolymer (sometimes referred to in the art as coagulum) based on the total weight of fluoropolymer produced.

The as-polymerized dispersion can be transferred to a dispersion concentration operation which produces concentrated dispersions stabilized typically with nonionic surfactants by known methods. Solids contents of concentrated dispersion is typically about 35 to about 70% by weight. Alternatively, for use as a molding resin, the dispersion is coagulated and the aqueous medium is removed. The fluoropolymer is dried then processed into a convenient form such as flake, chip or pellet for use in subsequent melt-processing operations.

The dispersion polymerization of homopolymer PTFE or modified PTFE is similar except that no comonomer or much less comonomer is added to the batch initially and/or introduced during polymerization. Chain transfer agents may be used but typically in lower amounts. Paraffin wax is typically employed as a stabilizer during the polymerization. The same dispersion concentration operation can be used to produce stabilized concentrated dispersions. Certain grades of PTFE dispersion are made for the production of fine powder. For this use, the dispersion is coagulated, the aqueous medium is removed and the PTFE is dried to produce fine powder.

Initiators

Polymerization in accordance with the invention employs free radical initiators capable of generating radicals under the conditions of polymerization. As is well known in the art, initiators for use in accordance with the invention are selected based on the type of fluoropolymer and the desired properties to be obtained, e.g., end group type, molecular weight, etc.

For some fluoropolymers such as melt-processible TFE copolymers, water-soluble salts of inorganic peracids are employed which produce anionic end groups in the polymer. Preferred initiators of this type have a relatively long half-life, preferably persulfate salts, e.g., ammonium persulfate or potassium persulfate. To shorten the half-life of persulfate initiators, reducing agents such as ammonium bisulfite or sodium metabisulfite, with or without metal catalyst salts such as Fe, can be used. Preferred persulfate initiators are substantially free of metal ions and most preferably are ammonium salts.

For the production of PTFE or modified PTFE dispersions for dispersion end uses, small amounts of short chain dicarboxylic acids such as succinic acid or initiators that produce succinic acid such as disuccinic acid peroxide (DSP) are preferably also added in addition to the relatively long half-life initiators such as persulfate salts. Such short chain dicarboxylic acids are typically beneficial in reducing undispersed polymer (coagulum). For the production of PTFE dispersion for the manufacture of fine powder, a redox initiator system such as potassium permanganate/oxalic acid is often used.

The initiator is added to the aqueous polymerization medium in an amount sufficient to initiate and maintain the polymerization reaction at a desired reaction rate. At least a portion of the initiator is added at the beginning of the polymerization. A variety of modes of addition my be used including continuously throughout the polymerization, or in doses or intervals at predetermined times during the polymerization. A particularly preferred mode of operation is for initiator to be precharged to the reactor and additional initiator to be continuously fed into the reactor as the polymerization proceeds. Preferably, total amounts of ammonium persulfate or potassium persulfate employed during the course of polymerization for melt-processable copolymers are about 25 ppm to about 250 ppm based on the weight of the aqueous medium. Other types of initiators, for example, potassium permanganate/oxalic acid initiators, can be employed in amounts and in accordance with procedures as known in the art.

Chain Transfer Agents

Chain-transfer agents may be used in a process in accordance with the invention for the polymerization of some types of polymers, e.g., for melt-processible TFE copolymers to decrease molecular weight for the purposes of controlling melt viscosity. Chain transfer agents useful for this purpose are well-known for use in the polymerization of fluorinated monomers. Preferred chain transfer agents include hydrogen, aliphatic hydrocarbons, halocarbons, hydrohalocarbons or alcohol having 1 to 20 carbon atoms, more preferably 1 to 8 carbon atoms. Representative examples of such chain transfer agents are alkanes such as ethane, chloroform and methanol.

The amount of a chain transfer agent and the mode of addition depend on the activity of the particular chain transfer agent and on the desired molecular weight of the polymer product. A variety of modes of addition may be used including a single addition before the start of polymerization, continuously throughout the polymerization, or in doses or intervals at predetermined times during the polymerization. The amount of chain train transfer agent supplied to the polymerization reactor is preferably about 0.005 to about 5 wt %, more preferably from about 0.01 to about 2 wt % based upon the weight of the resulting fluoropolymer.

Polymerization Agent

In accordance with the invention, the fluoropolyether acid or salt thereof is preferably dispersed adequately in aqueous medium for it to function effectively in combination with the hydrocarbon surfactant as a polymerization agent. Preferably, the fluoropolyether acid salt is dispersed sufficiently so that the polymerization medium containing fluoropolyether acid salt appears water clear or nearly water clear. More preferably, an aqueous concentrate of the dispersed fluoropolyether acid salt (and dispersing aid, if used) adjusted to contain 1500 ppm±100 ppm of the fluoropolyether acid salt has a haze in the test method described hereinafter of less than about 55%, preferably less than about 15%, more preferably less than about 13%, even more preferably less than about 10%, and most preferably less than about 7%. A preferred range for the haze of the aqueous concentrate of the dispersed fluoropolyether acid salt is from about 0 to about 55%. Low haze values at 1500 ppm±100 ppm correlate well with performance of the fluoropolyether salt as a nucleating agent in the aqueous polymerization process, e.g., polymerizations employing lower haze concentrates produce less undispersed polymer (coagulum) than concentrates with higher haze values. Haze values of the aqueous polymerization medium itself containing the dispersed fluoropolyether salt are less sensitive to the contribution of haze by the fluoropolyether salt because of the low fluoropolyether salt content and may be affected by other components in the aqueous polymerization medium.

In one suitable procedure, the polymerization agent can be made directly in the aqueous polymerization medium. In this procedure, the fluoropolyether acid or salt is supplied in acid form and subsequently converted to salt form. This is accomplished by first adding ammonia or alkali metal hydroxide to the aqueous polymerization medium in a quantity sufficient to substantially completely convert to salt form the subsequently added fluoropolyether acid. The fluoropolyether acid can then be added to the ammonia or alkali metal hydroxide solution and, if desired, pH measurements can be made to determine if insufficient or excess base has been used. In addition, as known in the art, the amount ammonia or alkali metal hydroxide used, together with other materials added to the polymerization medium, should provide a pH in the aqueous polymerization medium which promotes the desired level of activity for the particular initiator system used and provides an operable pH range for the polymerization agent. The hydrocarbon surfactant can be added to the aqueous polymerization medium prior to, simultaneously with or subsequently to the addition of the fluoropolyether acid.

Another suitable procedure for making the polymerization agent employs making an aqueous concentrate of the dispersed fluoropolyether acid or salt which is added to a larger volume of aqueous polymerization medium. The concentrate can be made by similarly reacting the fluoropolyether acid with a small volume of aqueous ammonia or alkali metal hydroxide to produce the concentrate containing the salt form of the fluoropolyether acid. This concentrate can then be mixed into the aqueous polymerization medium to supply the already dispersed fluoropolyether acid or salt in the desired quantity. In addition, as stated above, the amount ammonia or alkali metal hydroxide used to make the concentrate, should provide a pH in the aqueous polymerization medium which promotes the desired level of activity for the particular initiator system used and provides an operable pH range for the polymerization agent. The hydrocarbon surfactant can be added to the aqueous polymerization medium prior to, simultaneously with or subsequently to the addition of the fluoropolyether acid. If the same proportions of fluoropolyether acid or salt to hydrocarbon surfactant are to be used for multiple polymerizations, it may be convenient for the hydrocarbon surfactant to be present in the aqueous fluoropolyether acid or salt concentrate.

In a preferred form of the invention, dispersing aids are used to assist with dissolving/dispersing of the fluoropolyether acid or salt by contacting the acid or salt with the dispersing aid. A dispersing aid is especially useful for dissolving/dispersing higher molecular weight fluoropolyether acid or salt thereof, e.g., above about 1200 g/mol. Dispersing aids are useful in either procedure discussed above for dispersing the fluoropolyether acid or salt.

Any of a variety of dispersing aids may be used to aid in dissolving/dispersing the fluoropolyether acid or salt for use in accordance with the present invention. A surfactant, preferably the hydrocarbon surfactant to be used in polymerization, is useful to disperse fluoropolyether acid or salt. In general, and particularly when polymerizing a high molecular weight fluoropolymer, a low telogenic or non-telogenic dispersing aid is preferred. With some dispersing aids, it is desirable to mix the dispersing aid with fluoropolyether acid or salt prior to addition to the aqueous polymerization medium or to the aqueous medium that forms the concentrate.

One suitable class of dispersing aids includes C3 to C8 alcohols with a particularly suitable dispersing aid being t-butanol. When the fluoropolyether acid or salt is supplied in acid form and the ammonium salt is to be used in the polymerization agent, concentrates can be formed by simultaneously mixing fluoropolyether acid, t-butanol, and an aqueous ammonia solution and stirring. Hydrocarbon surfactant can be added subsequently. t-butanol is preferably added in an amount of about 0.5× to about 3× the weight of the fluoropolyether acid although the lowest amount which is effective is preferably employed to decrease telogenic effects. C3 to C8 alcohols such as t-butanol would generally not be used for polymerization of PTFE or modified PTFE because their telogenic activity may interfere with achieving the high molecular weight usually desired. In some cases, it is desirable for water to be present with the C3 to C8 alcohol, i.e., an alcohol/water mixture is used, to effectively disperse the fluoropolyether acid or salt.

Another particularly suitable class of dispersing aids are fluorinated organic acids or salts, preferably having a molecular weight of less than 500 g/mol, e.g., low molecular weight fluoromonoether acids or salts, low molecular weight fluoropolyether acids or salts, and low molecular weight perfluoroalkane carboxylic acids. Such dispersing aids have low telogenic activity and generally do not interfere with the use of wax. Suitable fluorinated organic acids or salt are low molecular weight fluoromonoether acids or salts, i.e., having a molecular weight of less than 500 g/mol, for example, $CF_3CF_2CF_2OCF(CF_3)COOH$. Fluoropolyether acids or salts with a molecular weight of less that 500 g/mol can also be used. When the fluoropolyether acid or salt is supplied in acid form, it is preferable for the fluorinated organic acid or salt to also be supplied in acid form. Preferably, the fluoropolyether acid and fluorinated organic acid are mixed together prior to addition to the aqueous polymerization medium or the aqueous medium used to make the concentrate. This mixture is preferably contacted with an aqueous ammonia solution to form dispersed fluoropolyether salt. Fluoromonoether acids or salts and fluoropolyether acids or salts, each having a molecular weight of less that 500 g/mol, are preferably added in an amount of at least about 0.5× times the weight of the fluoropolyether acid. Typically, amounts greater than about 20× are not necessary and preferably the lowest amount which is effective is employed. A particularly preferred range is about 0.5× to about 3×. Perfluoroalkane carboxylic acids having a molecular weight of less than 500 g/mol can function as dispersing aids but are not preferred for use in accordance with the present invention. If used, they are used in amounts less than about 300 ppm based on the weight of water in the aqueous medium.

In a preferred form of the invention, the polymerization agent employed in accordance with the present invention comprises a major amount by weight of fluoropolyether acid or salt thereof and a minor amount by weight of hydrocarbon surfactant. More preferably, the hydrocarbon surfactant comprises about 1% to about 45% by weight of the polymerization agent. Even more preferably, the hydrocarbon surfactant comprises about 1% to about 35% by weight of the polymerization agent. In a preferred embodiment of the present invention, the hydrocarbon surfactant comprises about 10% to about 30% by weight of the polymerization agent.

Preferably, the amount of fluoropolyether acid or salt used in the aqueous polymerization medium is about 5 to about 2000 ppm based on the weight of water in the aqueous polymerization medium, more preferably about 50 to about 1000 ppm, and most preferably about 100 to about 350 ppm. The total amount of polymerization agent combination used in a preferred process in accordance with the invention is about 5 to about 3000 ppm based on the weight of water in the aqueous medium. Preferably, the total amount of polymerization agent combination used is about 50 ppm to about 2000 ppm based on the weight of water in the aqueous medium, more preferably, about 150 ppm to about 500 ppm.

As described above, the hydrocarbon surfactant is preferably employed in minor amounts and with preferred amounts of hydrocarbon surfactant being based on the amount of fluoropolyether acid or salt employed. However, because the hydrocarbon surfactant can react with the initiator and is telogenic, i.e., acts to prematurely stop chain growth, the amount of hydrocarbon used in relation to the amount of initiator should be limited so polymerization will start and proceed at a desirable rate. For example, in the preferred form of the invention in which 100 ppm to about 350 ppm fluoropolyether acid or salt based on the weight of water are employed and all of the polymerization agent is added prior to polymerization, an especially preferred range for the hydrocarbon surfactant is about 10 to about 110 ppm. Higher quantities of hydrocarbon surfactant may be used if the polymerization agent, or at least the hydrocarbon component of the polymerization agent, is supplied during the course of polymerization as discussed below.

At least a portion of the polymerization agent is preferably added to the polymerization medium prior to the start of the polymerization. If added subsequently, a variety of modes of addition for the polymerization agent may be used including continuously throughout the polymerization, or in doses or intervals at predetermined times during the polymerization. In accordance with one embodiment of the invention, substantially all of the polymerization agent is added to the aqueous medium prior to the start of polymerization.

In accordance with the invention, the aqueous polymerization medium comprises less than about 300 ppm of perfluoroalkane carboxylic acid or salt fluorosurfactants, based on the weight of water in the aqueous medium. Perfluoroalkane carboxylic acid or salt fluorosurfactants include perfluoroalkane, e.g., ammonium perfluorooctanoate. Preferably, the aqueous polymerization medium comprises less than about 100 ppm of perfluoroalkane carboxylic acid or salt fluorosurfactants, more preferably less than 50 ppm. In a preferred embodiment of the invention, the aqueous polymerization medium is substantially free of perfluoroalkane carboxylic acid or salt fluorosurfactants. Substantially free of perfluoroalkane carboxylic acid or salt fluorosurfactants means that aqueous polymerization medium contains no more than about 10 ppm of such fluorosurfactants.

In accordance with a preferred form of the invention the polymerization agent combination used in the practice of this invention is preferably substantially free of perfluoropolyether oils (i.e., perfluoropolyethers having neutral end groups). Substantially free of perfluoropolyether oils means that aqueous polymerization medium contains no more than about 10 ppm of such oils based on water. This form of the invention is unlike the aqueous microemulsion system as disclosed in U.S. Pat. No. 4,864,006 to Gianetti et al. which employs such perfluoropolyether oils.

EXAMPLES

Test Methods

The fluoropolymer melting point (Tm) is measured by Differential Scanning Calorimeter according to the procedure of ASTM D 4591.

Comonomer content (PPVE or HFP) is measured by FTIR according to the method disclosed in U.S. Pat. No. 4,743,658, col. 5, lines 9-23.

Melt flow rate (MFR) is measured according to ASTM D-1238 at the temperature which is standard for the specific copolymer.

Haze is measured on an aqueous concentrate of the dispersed fluoropolyether acid salt (and dispersing aid, if used) which is adjusted to contain 1500 ppm±100 ppm of the fluoropolyether acid salt. The haze is measured in transmission mode on a Hunter® Color Quest XE spectrophotometer with sphere geometry using HunterLab Universal Software v 4.0. The sample cell is a 50 mm transmission cell. The transmission haze measurement is the ratio of diffuse light to the total light transmitted by a specimen multiplied by 100 to express a percentage of transmission.

Polymerization Agent Components

Two fluoropolyether acids are employed which are perfluoropolyether acids having carboxylic acid group (PFPEA) each having the repeat unit of Formula 1 above and are converted to ammonium salts in the examples which follow. PFPEA 1 has a number average molecular weight of about 1165 (n=about 6 in Formula 1). PFPEA 2 has a number average molecular weight of about 2100 (n=about 12 in Formula 1). PFPEA 2 is available commercially available as Krytox® 157 FSL from DuPont.

The hydrocarbon surfactants used in the Examples are the following:
  Triton X100—Dow Chemical
  Triton X45—Dow Chemical
  Tergitol TMN 100—Dow Chemical
  Pluronic 31 R1—BASF
  Pluronic 17R2—BASF
  Pluronic 10R5—BASF
  Avanel S-74—BASF
  Avanel S-70—BASF
  Iconol TDA-10—BASF
  Versatic 10—Resolution Performance Products The ammonium hydroxide is a 30 wt % aqueous solution (wt % calculated as $NH_3$).

For the Examples of the invention containing PFPEA 1 (Examples 1-19, Comparative 1), polymerization agent concentrates containing PFPEA 1 are made by first adding 900 g of deionized water to a 1 liter glass container. The amount of 30 wt % ammonium hydroxide indicated in Table 1 is added to the 900 g of deionized water. Then, the amount of PFPEA 1 indicated in Table 1 is added. The contents of the container are mixed either mechanically or with ultrasound to produce a slightly cloudy mixture (haze less than about 7%). The amount and type of hydrocarbon surfactant (HC) as indicated in the Table 1 below is added. Upon additional mixing, the mixture typically becomes water clear. Comparative 1 is made similarly without hydrocarbon surfactant.

TABLE 1

| Example | PFPEA (g) | HC | HC (g) | $NH_4OH$ (g) |
|---|---|---|---|---|
| Ex 1 | 0.76 | TritonX100 | 0.317 | 0.069 |
| Ex 2 | 0.76 | TritonX100 | 0.317 | 0.069 |
| Ex 3 | 0.76 | Triton X100 | 0.317 | 0.069 |
| Ex 4 | 1.3 | Triton X100 | 0.317 | 1.11 |
| Ex 5 | 0.78 | TritonX45 | 0.318 | |
| Ex 6 | 0.191 | TMN-100 | 0.317 | 1.0 |
| Ex 7 | 1.3 | TMN-100 | 0.317 | 1.11 |
| Ex 8 | 1.305 | Plur331R1 | 0.317 | 1.11 |
| Ex 9 | 1.305 | Plur331R1 | 0.317 | 1.11 |
| Ex 10 | 1.3 | Plur331R1 | 0.317 | 1.11 |
| Ex 11 | 1.3 | Plur171R2 | 0.317 | 1.11 |
| Ex 12 | 1.3 | Plur10R5 | 0.317 | 1.11 |
| Ex 13 | 1.3 | AvanelS74 | 0.317 | 1.11 |
| Ex 14 | 1.3 | AvanelS70 | 0.317 | 1.11 |
| Ex 15 | 0.078 | TDA-10 | 0.317 | 0.067 |
| Ex 16 | 0.633 | TDA-10 | 0.156 | 0.544 |
| Ex 17 | 1.3 | TDA-10 | 0.317 | 1.11 |
| Ex 18 | 0.078 | Vers 10 | 0.317 | 0.21 |
| Ex 19 | 1.3 | Vers 10 | 0.317 | 1.25 |
| Ex 20 | 1.3 | Triton X100 | 0.17 | 0.29 |
| Ex 21 | 1.27 | Avanel S74 | 0.167 | 0.29 |
| Comp 1 | 1.3 | — | | 1.96 |

Examples 1-19 use PFPEA-1
Examples 20 and 21 and Comparative Example 1 use PFPEA-2.

For Examples 20 and 21, polymerization agent concentrates containing PFPEA 2 are made by adding 1.30 g and 1.27 g PFPEA2, 2.60 g and 2.54 g t-butanol (dispersing aid), 2.60 g and 2.54 g deionized water, and 0.29 g and 0.29 g 30 wt % ammonium hydroxide to a vial which is sealed and shaken under cold running water to remove the heat of reaction. A colorless, single phase liquid results. This liquid is added dropwise with agitation to deionized water to make a clear mixture 274 ml in volume (haze less than about 3%). 1.3 g and 1.27 g hydrocarbon surfactant is added with stirring. The final mixture is water clear with a pH of 9.5.

Examples 1-21 and Comparative 1

The process of the invention is illustrated in the polymerization of melt-processible copolymers of tetrafluoroethylene (TFE) with perfluoro(alkyl vinyl ether), i.e., perfluoro(propyl vinyl ether) (PPVE).

Deaerated water is used in the polymerizations. It is prepared by pumping deionized water into a large stainless steel vessel and vigorously bubbling nitrogen gas for approximately 30 minutes through the water to remove oxygen.

In a 12 liter, horizontal autoclave equipped with a paddle agitator, 7.57 kg of deaerated water is added. The PFPEA 1 or PFPEA 2 concentrates described above charged to the autoclave to provide the polymerization medium for the Examples. 510 ml is charged for Examples 1-21 and Comparative 1. Based on the amounts employed to make the concentrates, Table 2A shows the amounts of polymerization agent components in the polymerization medium (ppm based on weight of water in the aqueous medium).

A vacuum of approximately 28 inches of water column (7 kPa) is applied to the reactor. The reactor is then raised to 30 psig (310 kPa) with gaseous TFE while agitating at 70 rpm. The agitator is stopped and the TFE pressure reduced to approximately 10 psig (100 kPa) by venting. This pressure/vent cycle is conducted two more times, further insuring that the contents of the autoclave are free of oxygen. Ethane (0.3-0.5 g) and PPVE (100 g) is then added to the reactor.

The reactor is then heated to 75° C. with agitation at 100 rpm. When at temperature, the reactor pressure is raised to a nominal 300 psig (2.17 MPa) by adding TFE (270-330 g). Initiator solution, containing 6.2 grams of ammonium persulfate in 1 liter of deionized water, is charged to the autoclave at a rate of 100 ml/min to provide a precharge of 0.45-2.66 g ammonium persulfate. Total initiator added is indicated in Table 2A. The same Initiator solution is pumped continuously to the autoclave during polymerization at a rate of 0.54 ml/min. At kickoff [10 psig (70 kPa) pressure drop is observed] the polymerization is deemed to have been started. Reactor pressure is allowed to cycle between 285 psig (2.1 MPa) and 315 psig (2.28 MPa) by intermittently making up monomers composed of 96 wt % TFE and 4 wt % PPVE. After the total monomers (including precharged PPVE and TFE) stated in Table 2A is reached, the agitator is stopped and the reactor vented to atmospheric pressure. The fluoropolymer dispersion thus produced has a solids content of greater than 10%. Polymer is isolated from the dispersion by freezing, thawing and filtration. Using a high speed agitator, the polymer is washed in deionized water and filtered several times before being dried overnight in a vacuum oven at 100 to 110° C. and a vacuum of 6 to 10 mm Hg (0.8–1.3 kPa). Results are reported in Table 2B.

TABLE 2A

TFE/PPVE Polymerization

| Example | PFPEA (g) | PFPEA (ppm) | Surfactant | Surfactant (g) | Surfactant (ppm) | APS (g) | Ethane (g) | Total Monomer |
|---|---|---|---|---|---|---|---|---|
| Ex 1 | 0.076 | 9 | Triton X100 | 0.317 | 38 | 2.93 | 0.5 | 2590 |
| Ex 2 | 0.076 | 9 | Triton X100 | 0.317 | 38 | 3.00 | 0.5 | 3091 |
| Ex 3 | 0.076 | 9 | Triton X100 | 0.317 | 38 | 3.00 | 0.5 | 3107 |
| Ex 4 (1) | 1.3 | 159 | Triton X100 | 0.317 | 39 | 0.94 | 0.5 | 2012 |
| Ex 5 | 0.78 | 96 | Triton X45 | 0.318 | 39 | 2.86 | 0.5 | 2093 |
| Ex 6 | 0.191 | 23 | TMN-100 | 0.317 | 39 | 2.68 | 0.5 | 2080 |
| Ex 7 | 1.3 | 159 | TMN-100 | 0.317 | 39 | 0.94 | 0.5 | 2019 |
| Ex 8 | 1.305 | 159 | Plur 31R1 | 0.317 | 39 | 3.06 | 0.3 | 3643 |
| Ex 9 | 1.305 | 159 | Plur 31R1 | 0.317 | 39 | 3.06 | 0.3 | 3642 |
| Ex 10 | 1.3 | 159 | Plur 31R1 | 0.317 | 39 | 2.86 | 0.3 | 2068 |
| Ex 11 (1) | 1.3 | 159 | Plur 17R2 | 0.317 | 39 | 0.94 | 0.5 | 1998 |
| Ex 12 (1) | 1.3 | 159 | Plur 10R5 | 0.317 | 39 | 0.94 | 0.5 | 2004 |
| Ex 13 (1) | 1.3 | 159 | Avanel S74 | 0.317 | 39 | 0.94 | 0.5 | 2023 |
| Ex 14 (1) | 1.3 | 159 | Avanel S70 | 0.317 | 39 | 2.86 | 0.5 | 2035 |
| Ex 15 | 0.078 | 10 | TDA-10 | 0.317 | 39 | 2.86 | 0.3 | 2040 |
| Ex 16 | 0.633 | 77 | TDA-10 | 0.156 | 19 | 2.86 | 0.3 | 2051 |
| Ex 17 (1) | 1.3 | 159 | TDA-10 | 0.317 | 39 | 0.94 | 0.3 | 2032 |
| Ex 18 | 0.078 | 10 | Vers 10 | 0.317 | 39 | 2.86 | 0.3 | 2047 |
| Ex 19 (1) | 1.3 | 159 | Vers 10 | 0.317 | 39 | 0.94 | 0.3 | 2029 |
| Ex 20 | 1.3 | 166 | Triton X100 | 0.17 | 22 | 0.50 | 0.3 | 1991 |
| Ex 21 | 1.27 | 162 | Avanel S74 | 0.167 | 21 | 3.27 | 0.3 | 1994 |
| Comp 1 | 1.3 | 159 | — | — | — | 0.61 | 0 | 2085 |

Examples 1-19 use PFPEA-1
Examples 20 and 21 and Comparative Example 1 use PFPEA-2.

TABLE 2B

TFE/PPVE Polymerization

| Example | Kick-off (min) | Completion Time (min) | Solids wt % | MPt. (° C.) | PPVE wt % | MFR | Undispersed Polymer (g) | Undispersed Polymer wt % |
|---|---|---|---|---|---|---|---|---|
| Ex 1 | 11 | 135 | 16.1 | 309 | 4.75 | 39 | 3 | 0.2% |
| Ex 2 | 16 | 171 | 16.4 | 308 | 5.63 | 46 | 0 | 0.0% |
| Ex 3 | 10 | 191 | 16.4 | 309 | 6.2 | 17 | 107 | 6.4% |
| Ex 4 (1) | 77 | 95 | 15.7 | 309 | 4.74 | 26 | 16 | 1.0% |
| Ex 5 | 13 | 135 | 15.9 | 311 | 4.78 | 17 | 0 | 0.0% |
| Ex 6 | 16 | 78 | 15.5 | 312 | 4.23 | 158 | 0 | 0.0% |
| Ex 7 | 35 | 92 | 15.8 | 311 | 4.38 | 38 | 0 | 0.0% |
| Ex 8 | 2 | 111 | 17 | 302 | 6.83 | 25 | 3 | 0.2% |
| Ex 9 | 2 | 200 | 27 | 307 | 5.8 | 43 | 182 | 5.7% |
| Ex 10 | 2 | 112 | 16.3 | 306 | 5.46 | 25 | 0 | 0.0% |
| Ex 11 (1) | 62 | 137 | 16.1 | 306 | 5.58 | 34 | 0 | 0.0% |
| Ex 12 (1) | 65 | 178 | 15.5 | 308 | 5.79 | 26 | 0 | 0.0% |
| Ex 13 (1) | 7 | 94 | 16.3 | 312 | 3.97 | 43 | 0 | 0.0% |
| Ex 14 (1) | 6 | 86 | 15.8 | 314 | 3.11 | 22 | 0 | 0.0% |
| Ex 15 | 1 | 121 | 17.4 | 308 | 5.72 | 20 | 14 | 0.8% |
| Ex 16 | 1 | 106 | 16.9 | 308 | 5.62 | 23 | 0 | 0.0% |
| Ex 17 (1) | 45 | 93 | 16.2 | 309 | 4.62 | 25 | 0 | 0.0% |
| Ex 18 | 7 | 115 | 16.8 | 309 | 5.61 | 24 | 13 | 0.8% |
| Ex 19 (1) | 76 | 145 | 14.8 | 309 | 5.14 | 30 | 0 | 0.0% |
| Ex 20 | 50 | 144 | 17.3 | 309.4 | 4.77 | 95 | 19.77 | 1.2% |

TABLE 2B-continued

TFE/PPVE Polymerization

| Example | Kick-off (min) | Completion Time (min) | Solids wt % | MPt. (° C.) | PPVE wt % | MFR | Undispersed Polymer (g) | wt % |
|---|---|---|---|---|---|---|---|---|
| Ex 21 | 5 | 139 | 18.1 | 312.1 | 4.05 | 74 | 26.98 | 1.5% |
| Comp 1 | 3 | 98 | Gel | 295, 322 | 4.1 | No Flow | — | — |

Example 22

The process of the invention is illustrated in the polymerization of melt-processible copolymers of tetrafluoroethylene (TFE) with hexafluoropropylene (HFP).

TFE-HFP copolymerization is run like that of Examples 1-19 for TFE-PPVE copolymers with the following differences:

Total water (initial charge plus water added with initiator and surfactant) 6610 g. Initiator precharge is 2.2 g added as 22 g/liter aqueous solution.

Initial HFP is charged as a 70:30 mixture with TFE: 579 g HFP, 244 g TFE for Example 22; 701 g HFP and 301 g TFE. Continuous monomer feed is TFE only. No ethane is added.

Quantities of materials employed are indicated in Table 3 and 4A. Table 4B reports the results.

TABLE 3

TFE/HFP Polymerization

| Example | PFPEA1 (g) | HC | HC (g) | NH$_4$OH (g) |
|---|---|---|---|---|
| Ex 22 | 1.305 | Plur 30R1 | 0.317 | 1.11 |

TABLE 4A

TFE/HFP Polymerization

| Example | PFPEA (g) | PFPEA (ppm) | HC (g) | HC (ppm) | APS (g) | Ethane (g) | Total Monomers |
|---|---|---|---|---|---|---|---|
| Ex 22 | 1.305 | 197 | 0.317 | 48 | 7.390 | 0 | 2323 |

TABLE 4B

TFE/HFP Polymerization

| Example | Kick-off (min) | Completion Time (min) | Solids wt % | MPt. (° C.) | HFP wt % | MFR | Undispersed Polymer (g) | wt % |
|---|---|---|---|---|---|---|---|---|
| Ex 22 | 61 | 206 | 22.6 | 227 | 16.44 | >100 | 70 | 3.2% |

What is claimed is:

1. A process comprising polymerizing at least one fluorinated monomer in an aqueous polymerization medium comprising initiator and polymerization agent to form an aqueous dispersion of particles of fluoropolymer, said aqueous dispersion of particles of fluoropolymer formed by said process having a fluoropolymers solids content of at least about 10% by weight, said polymerization agent comprising fluoropolyether acid or salt thereof and hydrocarbon surfactant, said aqueous polymerization medium comprising less than about 300 ppm of perfluoroalkane carboxylic acid or salt fluorosurfactants, wherein said polymerization agent comprises a major amount by weight of fluoropolyether acid or salt thereof and a minor amount by weight of hydrocarbon surfactant and wherein said fluoropolyether acid or salt thereof is present in said aqueous polymerization medium in an amount of about 5 ppm to about 2000 ppm based on the weight of water in said aqueous polymerization medium.

2. The process of claim 1 wherein said fluoropolyether acid or salt thereof is present in said aqueous polymerization medium in an amount of about 50 ppm to about 1000 ppm based on the weight of water in said aqueous polymerization medium.

3. The process of claim 1 wherein said fluoropolyether acid or salt thereof is present in said aqueous polymerization medium in an amount of about 100 ppm to about 350 ppm based on the weight of water in said aqueous polymerization medium.

4. A process comprising polymerizing at least one fluorinated monomer in an aqueous polymerization medium comprising initiator and polymerization agent to form an aqueous dispersion of particles of fluoropolymer, said polymerization agent comprising fluoropolyether acid or salt thereof and hydrocarbon surfactant, said aqueous polymerization medium comprising less than about 300 ppm of perfluoroalkane carboxylic acid or salt fluorosurfactants, wherein said aqueous dispersion of particles of fluoropolymer formed by said process has a fluoropolymers solids content of at least about 20% by weight.

* * * * *